United States Patent
Eide et al.

(10) Patent No.: US 10,545,771 B2
(45) Date of Patent: Jan. 28, 2020

(54) CONCURRENT MAINTENANCE OF AN INPUT/OUTPUT ADAPTER BACKING A VIRTUAL NETWORK INTERFACE CONTROLLER

(71) Applicant: International Business Machines Corporation, Armonk, NY (US)

(72) Inventors: Curtis S. Eide, Rochester, MN (US); Dwayne G. McConnell, Cedar Park, TX (US); Xiaohan Qin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 15/632,586

(22) Filed: Jun. 26, 2017

(65) Prior Publication Data
US 2018/0157496 A1  Jun. 7, 2018

Related U.S. Application Data

(60) Provisional application No. 62/429,119, filed on Dec. 2, 2016.

(51) Int. Cl.
*G06F 9/445* (2018.01)
*G06F 15/17* (2006.01)
(Continued)

(52) U.S. Cl.
CPC .......... *G06F 9/445* (2013.01); *G06F 8/62* (2013.01); *G06F 9/45558* (2013.01); *G06F 15/17* (2013.01); *H04L 67/34* (2013.01)

(58) Field of Classification Search
CPC ....... G06F 2009/45579; G06F 9/45558; G06F 2201/815; G06F 11/1484; G06F 8/65;
(Continued)

(56) References Cited

U.S. PATENT DOCUMENTS

| 7,783,788 | B1 * | 8/2010 | Quinn | G06F 9/5077 |
| | | | | 710/10 |
| 7,861,100 | B2 | 12/2010 | Eide et al. | |

(Continued)

FOREIGN PATENT DOCUMENTS

| EP | 2 173 060 A1 | 4/2010 |
| WO | WO-2005/083946 A1 | 9/2005 |
| WO | WO-2014/199611 A1 | 12/2014 |

OTHER PUBLICATIONS

Koponen et al., *Network Virtualization in Mutli-tenant Datacenters*, 11th USENIX Symposium on Networked Systems Design and Implementation, Apr. 2014, 15 pages, USENIX Association, Berkeley, California.

(Continued)

*Primary Examiner* — Sargon N Nano
(74) *Attorney, Agent, or Firm* — Peter J. Edwards

(57) ABSTRACT

Concurrent maintenance of an input/output (I/O) adapter backing a virtual network interface connection (VNIC) including receiving, by a hardware management console (HMC), a request to disconnect the I/O adapter from a computing system, wherein the computing system comprises a logical partition and virtual I/O server; instructing, by the HMC over a communications link, the virtual I/O server to deconfigure and remove the server VNIC driver; determining, by the HMC, that a replacement I/O adapter is installed on the computing system; and in response to determining that the replacement I/O adapter is installed on the computing system, instructing, by the HMC over the communications link, the virtual I/O server to add and configure a replacement server VNIC driver.

20 Claims, 5 Drawing Sheets

Figure 1:
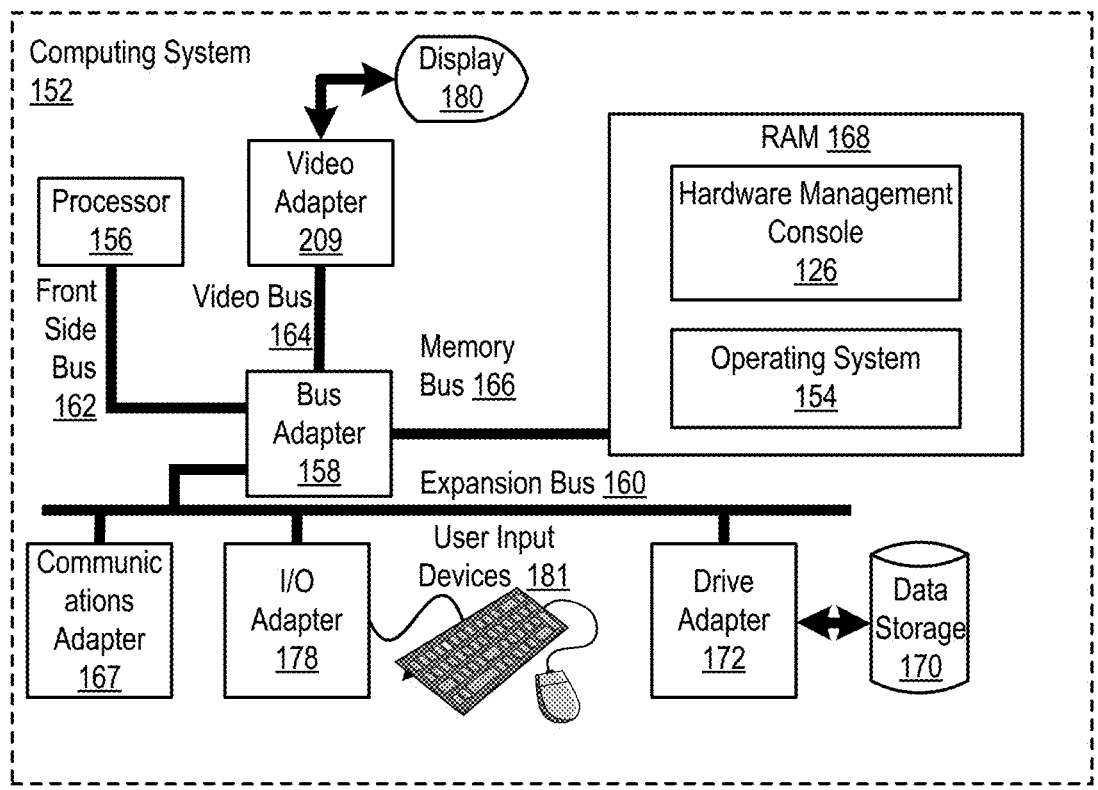

(51) Int. Cl.
*G06F 9/455* (2018.01)
*H04L 29/08* (2006.01)
*G06F 8/61* (2018.01)

(58) Field of Classification Search
CPC .. G06F 9/4411; G06F 9/5077; G06F 11/2033; G06F 15/17; G06F 8/62; G06F 9/445; G06F 11/0712; G06F 12/0646; G06F 15/16; H04L 43/0811; H04L 49/70; H04L 69/40; H04L 41/0806; H04L 41/082
See application file for complete search history.

(56) References Cited

U.S. PATENT DOCUMENTS

| | | | |
|---|---|---|---|
| 8,561,064 B2 | 10/2013 | Eide et al. | |
| 8,843,688 B2* | 9/2014 | Engebretsen | G06F 9/4411 710/316 |
| 8,879,570 B2* | 11/2014 | Nagapudi | H04L 12/12 370/419 |
| 9,323,620 B2* | 4/2016 | Graham | G06F 11/1415 |
| 9,647,894 B2* | 5/2017 | Nair | H04L 12/4641 |
| 2009/0133016 A1* | 5/2009 | Brown | G06F 9/45558 718/1 |
| 2010/0211946 A1* | 8/2010 | Elzur | G06F 9/45537 718/1 |
| 2012/0124572 A1* | 5/2012 | Cunningham | G06F 9/45558 718/1 |
| 2012/0137288 A1* | 5/2012 | Barrett | G06F 9/45558 718/1 |
| 2012/0151472 A1* | 6/2012 | Koch | G06F 9/45558 718/1 |
| 2012/0151473 A1* | 6/2012 | Koch | G06F 9/45558 718/1 |
| 2012/0159245 A1* | 6/2012 | Brownlow | G06F 11/0712 714/23 |
| 2012/0179932 A1* | 7/2012 | Armstrong | G06F 11/20 714/4.11 |
| 2012/0297379 A1 | 11/2012 | Anderson et al. | |
| 2014/0372794 A1* | 12/2014 | Graham | G06F 9/5077 714/15 |
| 2014/0373007 A1 | 12/2014 | Donnellan et al. | |
| 2016/0034317 A1* | 2/2016 | Nair | H04L 12/4641 709/223 |

OTHER PUBLICATIONS

Anonymous, *Method for Managing, Controlling, and Serializing Concurrent Maintenance Procedures on a Computer System*, IBM, an IP.com Prior Art Database Technical Disclosure, IP.com No. IPCOM000196503D, IP.com Electronic Publication Date: Jun. 3, 2010, 6 pages.

* cited by examiner

CONCURRENT MAINTENANCE OF AN INPUT/OUTPUT ADAPTER BACKING A VIRTUAL NETWORK INTERFACE CONTROLLER

CROSS-REFERENCE TO RELATED APPLICATION

This application is a non-provisional application for patent entitled to a filing date and claiming the benefit of earlier filed U.S. Provisional Patent Application Ser. No. 62/429,119, filed Dec. 2, 2016.

BACKGROUND

Field of the Invention

The field of the invention is data processing, or, more specifically, methods, apparatus, and products for concurrent maintenance of an input/output (I/O) adapter backing a VNIC.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for concurrent maintenance of an input/output (I/O) adapter backing a VNIC are disclosed in this specification. Concurrent maintenance of an I/O adapter backing a VNIC includes receiving, by a hardware management console (HMC), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition; instructing, by the HMC over a communications link, the virtual I/O server to deconfigure and remove the server VNIC driver, wherein the virtual I/O server, in response, gracefully shuts down a server VNIC driver, causing the server VNIC driver to deregister the CRQ with the hypervisor, and wherein in response to receiving a close message on the CRQ, the client VNIC driver enters a wait state; determining, by the HMC, that a replacement I/O adapter is installed on the computing system; and in response to determining that the replacement I/O adapter is installed on the computing system, instructing, by the HMC over the communications link, the virtual I/O server to add and configure a replacement server VNIC driver, wherein the virtual I/O server, in response, instantiates a replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE SEVERAL VIEWS OF THE DRAWING(S)

FIG. 1 sets forth a block diagram of an example system configured for concurrent maintenance of an input/output (I/O) adapter backing a VNIC according to embodiments of the present invention.

Figure 2:
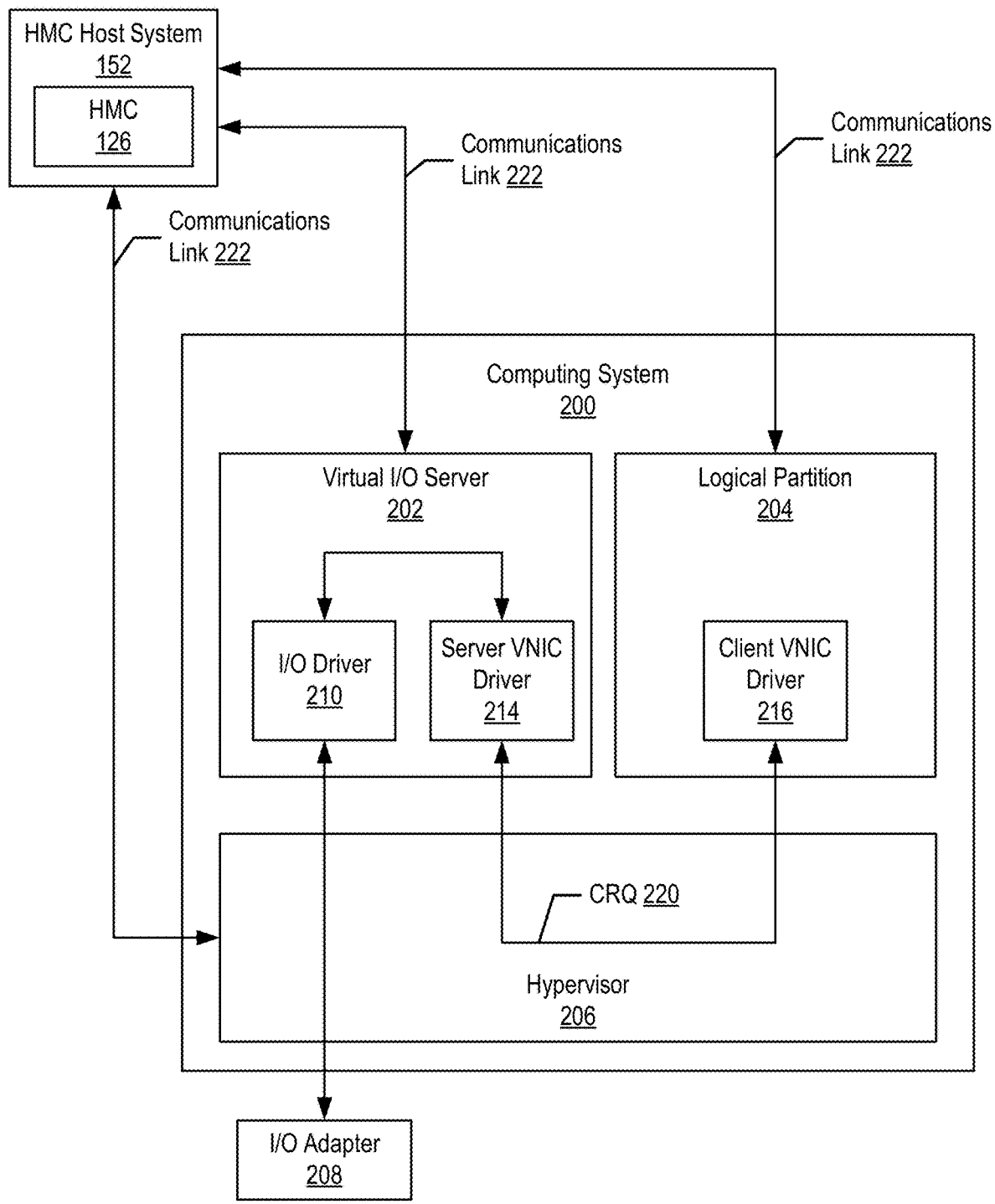

FIG. 2 sets forth a block diagram of an example system configured for concurrent maintenance of an I/O adapter backing a VNIC according to embodiments of the present invention.

Figure 3:
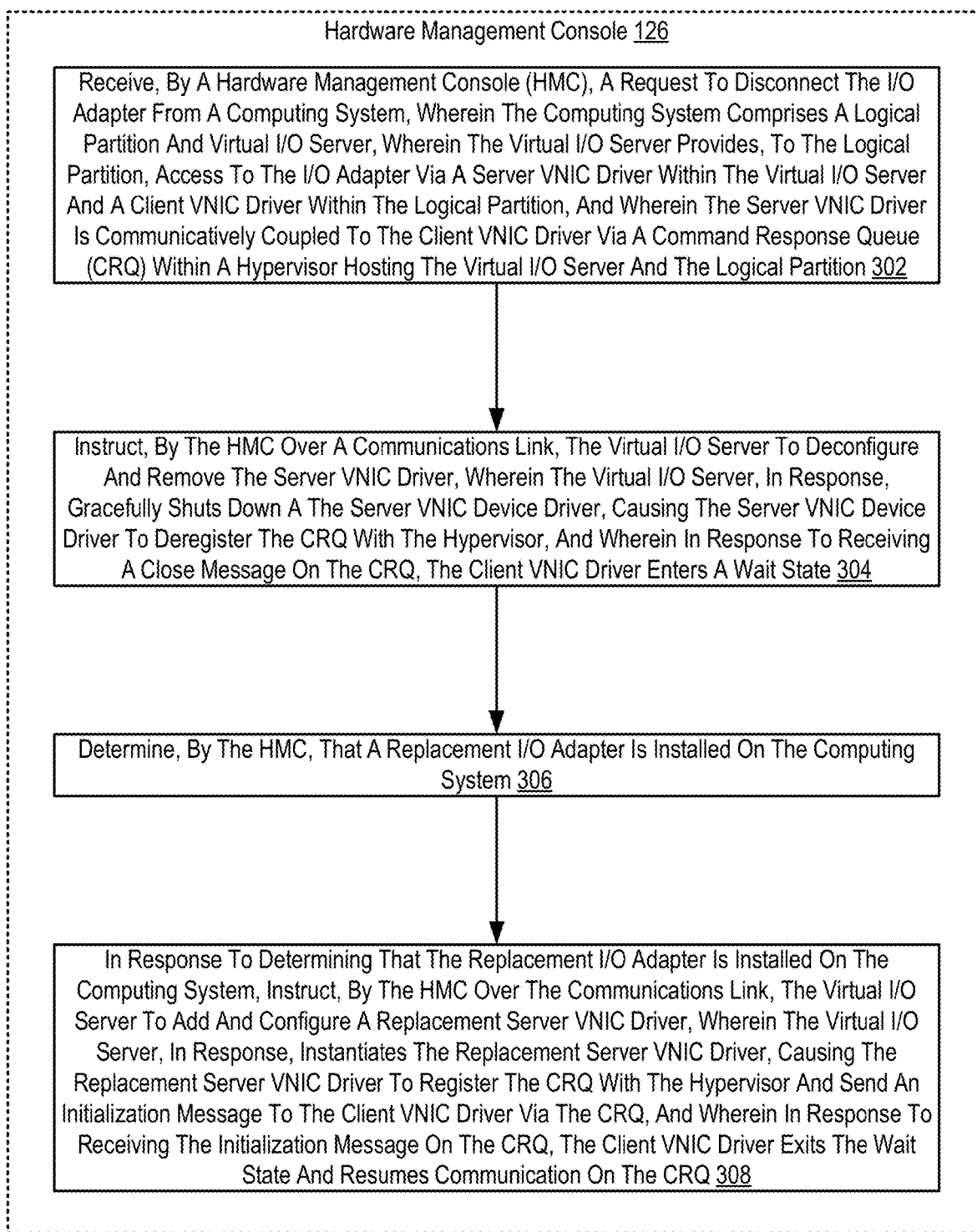

FIG. 3 sets forth a flow chart illustrating an exemplary method for concurrent maintenance of an I/O adapter backing a VNIC according to embodiments of the present invention.

Figure 4:
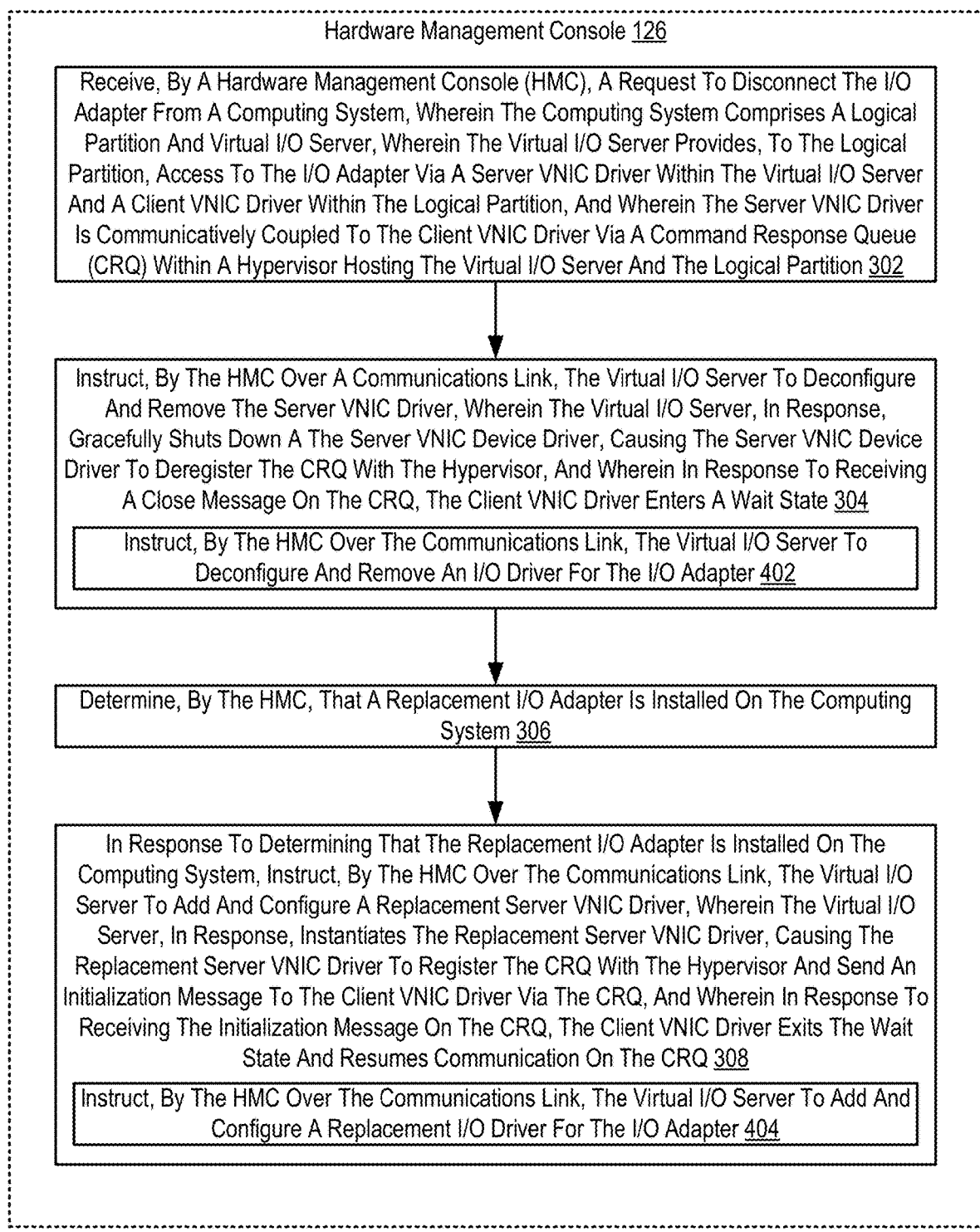

FIG. 4 sets forth a flow chart illustrating an exemplary method for concurrent maintenance of an I/O adapter backing a VNIC according to embodiments of the present invention.

Figure 5:
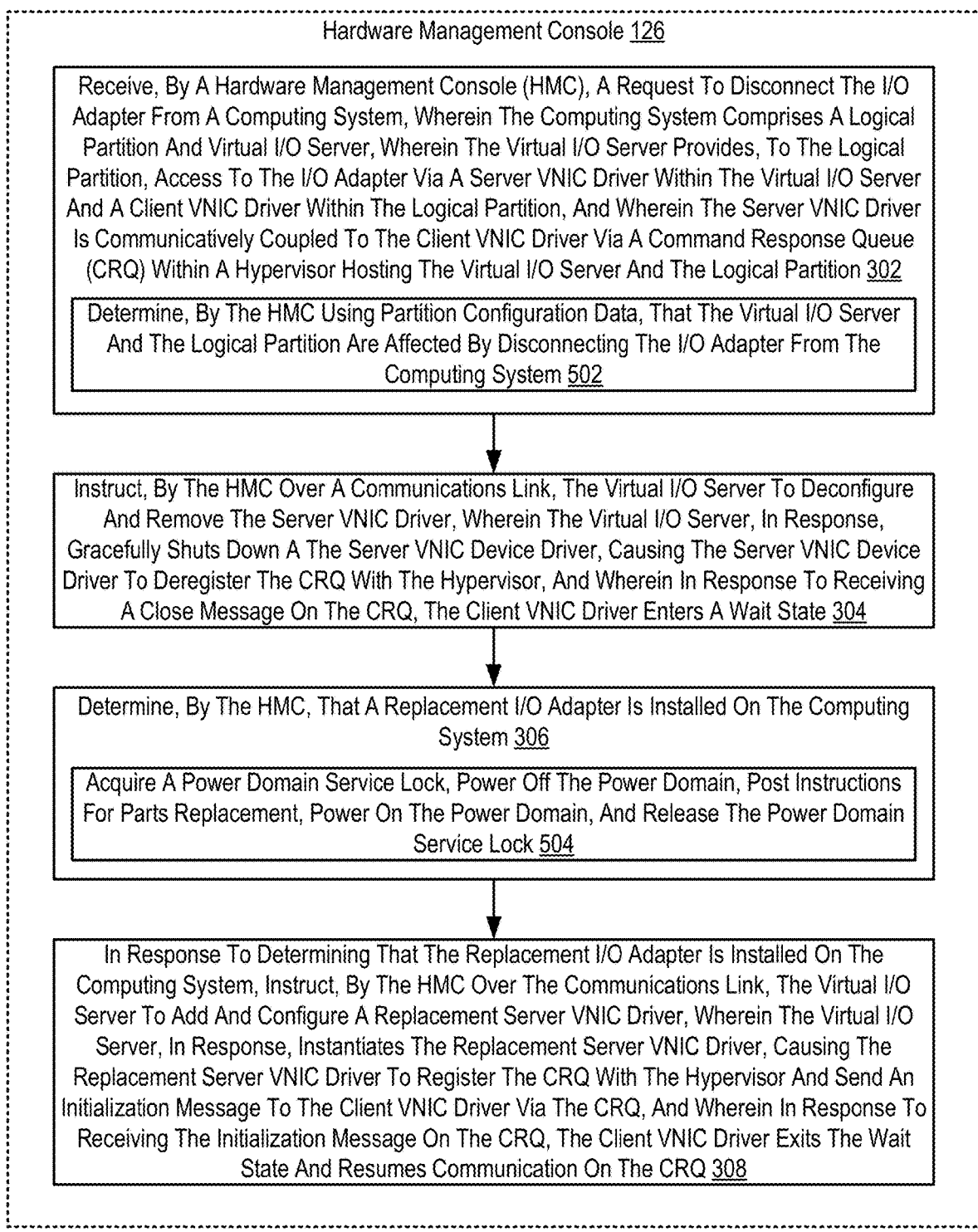

FIG. 5 sets forth a flow chart illustrating an exemplary method for concurrent maintenance of an I/O adapter backing a VNIC according to embodiments of the present invention.

DETAILED DESCRIPTION

Exemplary methods, apparatus, and products for concurrent maintenance of an input/output (I/O) adapter backing a VNIC in accordance with the present invention are described with reference to the accompanying drawings, beginning with FIG. 1. FIG. 1 sets forth a block diagram of automated computing machinery comprising an exemplary computing system (152) configured for concurrent maintenance of an I/O adapter backing a VNIC according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for concurrent maintenance of an I/O adapter backing a VNIC according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) is a hardware management console (HMC) (126), a module of computer program instructions for concurrent maintenance of an I/O adapter backing a VNIC.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for concurrent maintenance of an I/O adapter backing a VNIC according to embodiments of the present invention include Integrated Drive Electronics (IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for concurrent maintenance of an I/O adapter backing a VNIC according to embodiments of the present invention include modems for wired dial-up communications, Ethernet (IEEE 802.3) adapters for wired data communications, and 802.11 adapters for wireless data communications.

FIG. 2 shows elements of an example system configured for concurrent maintenance of an I/O adapter backing a VNIC in accordance with the present invention. As shown in FIG. 2, the system includes an HMC host system (152) that includes the HMC (126). The HMC host system (152) is communicatively coupled to the computing system (200) via the communications links (222). The computing system (200) includes a virtual input/output (I/O) server (202), a logical partition (204) and a hypervisor (206). The computing system (200) is also connected to the I/O adapter (208). The virtual I/O server (202) includes an I/O driver (210) and a server VNIC driver (214). The logical partition (204) includes a client VNIC driver (216). The hypervisor (206) includes the command response queue (CRQ) (220) communicatively coupling the server VNIC driver (214) and the client VNIC driver (216).

The HMC host system (152) is a computing system capable of hosting the HMC (126). The HMC (126) is software, hardware, or an aggregation of both software and hardware configured to receive requests to perform management tasks on the computing system (200). Such management tasks may include instructing the hypervisor (206), virtual I/O server (202), and the logical partition (204) by sending commands on the communications links (222).

The HMC (126) may include partition configuration data that describes the configuration of the logical partitions and virtual I/O servers on the computing system (202). The partition configuration data may include partition slot locations, resources assigned to each partition (such as processors and memory), I/O drivers, virtual adapters, and VNICs hosted on the virtual I/O servers and logical partitions, and the associations between physical adapters that back VNICs and the VNICs backed by the physical adapters.

The computing system (202) is a system separate from the HMC host system (152) connected to the HMC host system (152) via communications links (222). The computing system (202) executes a hypervisor (206) hosting one or more virtual I/O servers (such as virtual I/O server (202)) and one or more logical partitions (such as logical partition (204)). The virtual I/O server (202) is an execution environment that hosts software and applications in support of the logical partition (204). The virtual I/O server (202) hosts an I/O driver (210) that represents and controls a physical communications port on I/O adapter (208), or a specified percent of a shared physical port. The virtual I/O server (202) also includes a server VNIC driver (214). The computing system (200) may be a multi-user mainframe computer system, a single-user system, or a server computer or similar device that has little or no direct user interface, but receives requests from other client computing systems.

The server VNIC driver (214) is a virtual device with the capability to send and receive data packets (or data pointers) to the client VNIC driver (216) and post receipt buffers for incoming data. The server VNIC driver (214) is an interface for the virtual I/O server (202) to communicate with the logical partition (204). The server VNIC driver (214) provides a control path between the I/O driver (210) and the client VNIC driver (216) via the CRQ (220).

The I/O driver (210) provides access to the physical I/O adapter (208). Specifically, the I/O driver (210) provides an interface to elements on the virtual I/O server (202) (such as the server VNIC driver (214)) to send and receive data using the physical I/O adapter (208). In this way, the physical I/O adapter (208) backs the server VNIC driver (214) and the client VNIC driver (216). For example, the physical I/O adapter (208) may be a physical fiber channel adapter, and the I/O driver may include an interface for the physical fiber channel adapter. Alternatively, the I/O driver (210) may represent one of several virtual functions for a single root I/O virtualization (SR-IOV) adapter. The physical I/O adapter (208) may be a SR-IOV adapter that includes a physical function. Other virtual functions may be assigned to different virtual I/O servers or logical partitions.

A physical function is an addressable entity that represents a physical resource and is used or specified by transactions, commands, or requests to access the represented physical resource. A physical function may be a set of logic that is represented by a single configuration space. In other words, the physical functions are configurable based on configuration data stored in the physical functions or associated configuration space in the memory of the respective I/O adapter. The computing system (200) sends the configuration data to the respective I/O adapter, and that I/O adapter uses that configuration data to alter the interface provided by the physical function or to alter the actions taken by the physical function in response to commands, transactions, or requests sent by the computing system (200) to the physical function of the respective I/O adapter. Examples of physical resources include ingress ports, egress ports, circuit logic, work queues, data buffers, and units of memory or storage. Examples of operations that physical functions may perform include, but are not limited to adapter level initialization, reset, recovery, and offload engine operations.

The virtual functions are addressable entities, identifiers, names, or numbers that share physical resources implemented by the same physical function. Different requesters (e.g., different virtual function device drivers or different operating systems or applications in the logical partitions) specify different virtual functions in their respective transaction, commands, or requests that they send to the I/O adapters, which request access to the shared physical functions and the represented physical resources. These different virtual functions specified by the different requesters allow the different requesters to share the same physical functions, allow the I/O adapters to distinguish between commands, requests, or transactions that arrive from different requesters, and allow different requesters to access different memory spaces within the I/O adapter, receive different interrupts from the I/O adapters, and send and receive different data streams to/from the I/O adapters.

The physical resources may be allocated to a particular virtual function and not shared with any other virtual function; that is, the physical resources represented by a particular virtual function are exclusively allocated to one virtual function. The physical resources allocated to one virtual function may be allocated to another virtual function, at the same time (concurrently) or at a different time (non-concurrently).

The computing system (200) includes a number of physical slots for connecting I/O adapters (such as I/O adapter (208)). Each slot includes electrical connectors and/or buses. Each I/O adapters (such as I/O adapter (208)) includes circuit boards, cards, integrated circuits, logic devices, any other appropriate hardware, or any combination, portion, or multiple thereof. The I/O adapter (208) may occasionally require maintenance or replacement. However, removing the I/O adapter (208) from the computing system (200) may cause an interruption in service to the logical partition (204).

The CRQ (220) is a data path between the server VNIC driver (214) and the client VNIC driver (216) managed by the hypervisor (206). The CRQ (220) may provide an I/O connection between the server VNIC driver (214) and the client VNIC driver (216). Further, messages may be sent on the CRQ (220) for management purposes, such as close message (to close or suspend the CRQ connection) or an open message (to initiate or resume the CRQ connection).

The hypervisor (206) is a management layer responsible for hosting the virtual I/O server (202) and the logical partition (204). The hypervisor (206) may manage the resources assigned to the virtual I/O server (202) and logical partition (204). Further, the hypervisor (206) may manage the CRQ (220) between the virtual I/O server (202) and logical partition (204). For example, the hypervisor (206) may receive a close or deregistration message from a VNIC (such as client VNIC driver (216) or server VNIC driver (214)), and in response the hypervisor (206) may place a close message on the CRQ (220) to be received by the remaining endpoint of the CRQ (220).

The logical partition (204) is an isolated execution environment assigned a subset of the resources of the computing system (200), such as processor and memory resources. The logical partition (204) may be provided access to the I/O adapter (208) via the CRQ and virtual I/O server (202). In logical partitioning, a single physical computer system operates essentially like multiple and independent virtual computers. Each logical partition executes a separate operating system (which may the same or different from each other), and from the perspective of users and of the applications executing in the logical partition, operates as a fully independent computer. The various resources in the physical computer system are allocated among the various logical partitions via the hypervisor (206). The resources may include the processors, adapters, virtual or physical functions in the adapters, input/output devices, network bandwidth, and the memory. The physical memory of a computer system is typically allocated among various logical partitions using a technique known as virtual memory. Virtual memory gives each logical partition the impression or view that it is accessing contiguous memory within a range of contiguous virtual addresses, also known as an address space, but in fact the memory pieces that each logical partition accesses may be physically fragmented and non-contiguous, meaning that they are scattered at various locations at non-contiguous physical addresses in the physical memory and may overflow to secondary storage, such as disk drives, which are typically larger and slower than memory.

The logical partition (204) may send and receive data using the client VNIC driver (216). The client VNIC driver (216) is a virtual device with the capability to send and receive data packets (or data pointers) over the network and post receipt buffers for incoming data. The client VNIC driver (216) allows the logical partition (204) to communicate with other entities on the network as though the logical partition had ownership of the physical I/O adapter (208). The client VNIC driver (216) provides a control path between the client VNIC driver (216) and the server VNIC driver (214) via the CRQ (220).

The client VNIC driver (216) is configured to enter and exit a wait state based on messages received via the CRQ (220). Entering a wait state may include suspending outgoing data transmission to the server VNIC driver (214) associated with the client VNIC driver (216) and cancelling or suspending pending incoming transfers. Exiting the wait state may include resuming outgoing data transmission to the server VNIC driver (214) associated with the client VNIC driver (216) and resuming or reinitiating pending incoming transfers.

The communications links (222) are direct communications links between the HMC host system (152) and the hypervisor (206), virtual I/O server (202), and the logical partition (204). The communications links (222) are separate and distinct from the CRQ (220). The communications links (222) may be used for management commands sent from the HMC (126), including commands to add or remove VNICs, configure or deconfigure VNICs, add or remove physical I/O resources, or configure or deconfigure physical I/O resources.

To initiate a removal (for replacement or maintenance) of a physical I/O adapter (208), the HMC (126) may send commands to the virtual I/O server (202) to deconfigure the logical partition resources (such as the VNIC and I/O drivers) backed by the physical I/O adapter (208). In contrast to other I/O concurrent maintenance scenarios involving PCIe adapters or virtual function partitionable endpoints (PEs), the user in this embodiment does not need to manually deconfigure the logical partition resources associated with the partitionable endpoints (e.g., by logging in to the operating systems and executing the appropriate commands). That is, manual intervention is conventionally required because deconfiguring these resources may have adverse effects on workloads running in the logical partition using the resources backed by the physical I/O adapter (208). However, instructing, by the HMC (126), the virtual I/O server (202) to deconfigure the resources associated with the physical I/O adapter (208), may only affect the client VNIC driver (216), and thus the impact of deconfiguring the I/O adapter resources is limited to the client VNIC driver (216). When the server VNIC driver (214) is deconfigured, the server VNIC driver (214) deregisters the CRQ (220), at which point the hypervisor (206) places a close message on the CRQ (220) for the client VNIC driver (216), alerting the client VNIC driver (216) that the server VNIC driver (214) has been removed. The client VNIC driver (216) begins waiting for the server VNIC driver (214) to return. When the server VNIC driver (214) is reconfigured, the server VNIC driver (214) sends initialization messages to the client VNIC driver (216) at which point communications between the server VNIC driver (214) and the client VNIC driver (216) resume automatically.

For further explanation, FIG. 3 sets forth a flow chart illustrating an exemplary method for concurrent maintenance of an I/O adapter backing a VNIC according to embodiments of the present invention that includes receiving (302), by a hardware management console (HMC) (126), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition. Receiving (302), by a hardware management console (HMC) (126), a request to disconnect the I/O adapter from a computing system may be carried out by a user interacting with the HMC (126). The user may be initiating the removal of the I/O adapter from a computing system managed by the HMC (126). The removal of the I/O adapter may be for maintenance or like-type replacement of the I/O adapter. The request may be received via a graphical user interface for the HMC (126)

The method of FIG. 3 also includes instructing (304), by the HMC (126) over a communications link, the virtual I/O server to deconfigure and remove the server VNIC driver, wherein the virtual I/O server, in response, gracefully shuts down the server VNIC driver, causing the server VNIC driver to deregister the CRQ with the hypervisor, and wherein in response to receiving a close message on the CRQ, the client VNIC driver enters a wait state. Instructing (304), by the HMC (126) over a communications link, the virtual I/O server to deconfigure and remove the server VNIC driver may be carried out by first sending an instruction to deconfigure the server VNIC driver on the virtual I/O server. A deconfigure instruction is an instruction to prepare a virtual device and/or the supporting software constructs for removal. The instruction to deconfigure may be sent directly from the HMC (126) to the virtual I/O server using the communications link. The communications link may bypass the hypervisor and logical partition.

In response to receiving the deconfigure instruction from the HMC (126), the virtual I/O server gracefully shuts down the server VNIC driver. Gracefully shutting down the server VNIC driver may be carried out by releasing resources previously dedicated to the server VNIC driver, such as locations in physical or virtual memory. Gracefully shutting down the server VNIC driver may also be carried out by notifying software constructs on the virtual I/O server that the removal of the server VNIC driver is imminent. Gracefully shutting down the server VNIC driver may also include deleting the server VNIC driver.

Gracefully shutting down the server VNIC driver causes the server VNIC driver to deregister the CRQ with the hypervisor. Specifically, the server VNIC driver makes a call to the hypervisor to deregister the CRQ for the server VNIC driver. The call to the hypervisor may include an identifier of the target client VNIC driver. The close or deregister CRQ message may be sent on the CRQ itself and received by the hypervisor. In response, the hypervisor places a close message on the CRQ for the client VNIC driver.

In response to receiving the close message on the CRQ, the client VNIC driver enters a wait state. During the wait state, the client VNIC driver may maintain the resources assigned to the client VNIC driver, such as physical or virtual memory locations. Further, the client VNIC driver may continue some operations, such as listening on the CRQ for an initialization message. In entering the wait state, the client VNIC driver does not raise errors due to failing to receive expected data or messages.

The method of FIG. 3 also includes determining (306), by the HMC (126), that a replacement I/O adapter is installed on the computing system. Determining (306), by the HMC (126), that a replacement I/O adapter is installed on the computing system may be carried out by receiving a notification from the computing system that the physical installation of the replacement I/O adapter has been completed. Determining (306), by the HMC (126), that a replacement I/O adapter is installed on the computing system may also be carried out by receiving a notification from a user that the physical installation of the replacement I/O adapter has been completed.

The replacement I/O adapter may be the same I/O adapter removed from the computing system. The replacement I/O adapter may refer to the I/O adapter after offline maintenance has been performed. Alternatively, the replacement I/O adapter may be a different but like-type I/O adapter to the I/O adapter removed from the computing system.

The HMC (126) may receive a notification that the virtual I/O server has successfully deconfigured the server VNIC driver. Once the HMC (126) is notified that the virtual I/O server has successfully deconfigured the server VNIC driver, or after a period of time, the HMC (126) may send a separate instruction to remove the server VNIC driver. In response to receiving the instruction to remove the server VNIC driver, the virtual I/O server may delete the server VNIC driver.

The method of FIG. 3 also includes in response to determining that the replacement I/O adapter is installed on the computing system, instructing (308), by the HMC (126) over the communications link, the virtual I/O server to add and configure a replacement server VNIC driver, wherein the virtual I/O server, in response, instantiates the replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ. Instructing (308), by the HMC (126) over the communications link, the virtual I/O server to add and configure a replacement server VNIC driver may be carried out by first sending an instruction to add the server VNIC driver on the virtual I/O server. An add instruction is an instruction to instantiate a virtual device and/or the supporting software constructs. The instruction to add a server VNIC driver may be sent directly from the HMC (126) to the virtual I/O server using the communications link. In response to receiving the instruction from the HMC (126) to add the replacement server VNIC driver, the virtual I/O server instantiates a replacement server VNIC driver.

The HMC (126) may receive a notification that the virtual I/O server has successfully instantiated the replacement server VNIC driver. Once the HMC (126) is notified that the virtual I/O server has successfully instantiated the replacement server VNIC driver, or after a period of time, the HMC (126) may send a separate instruction to configure the server VNIC driver. In response to receiving the instruction from the HMC (126) to configure the replacement server VNIC driver, the virtual I/O server instantiates a replacement server VNIC driver. The HMC (126) may also send an identifier of the logical partition to the virtual I/O server with the instruction to add and configure.

Instantiating the replacement server VNIC driver causes the replacement server VNIC driver to register the CRQ with the hypervisor and send an initialization message to the client VNIC driver via the CRQ. The server VNIC driver may make a call to the hypervisor to register a CRQ with an identifier of the target logical partition and/or target client VNIC driver. In response to receiving the CRQ registration message, the hypervisor may create or recreate the CRQ between the server VNIC driver on the virtual I/O server and the client VNIC driver on the logical partition.

Once the CRQ between the server VNIC driver and the client VNIC driver is reestablished, the server VNIC driver sends the initialization message to the client VNIC driver. The initialization message informs the client VNIC driver that the server VNIC driver is operating and prepared to send and receive data. In response to receiving the initialization message on the CRQ, the client VNIC driver exits the wait state and resumes communication on the CRQ. Exiting the wait state may be carried out by resuming data transmission on the CRQ. The client VNIC driver may also respond to the initialization message by sending, to the server VNIC driver, a message indicating that the client VNIC driver has exited the wait state and will resume sending and receiving data on the CRQ.

The instructions to deconfigure and remove and the instructions to add and configure may be sent to the same virtual I/O server instance. Alternatively, the instructions to add and configure may be sent to a separate virtual I/O server instance.

Each of the steps 304, 306, and 308 as described above are performed automatically and without user intervention. Specifically, once a user requests to disconnect the I/O adapter from the computing system, the HMC, virtual I/O server, and logical partition carry out the remaining steps without the need for a user to manually configure or communicate with the virtual I/O server or logical partition.

For further explanation, FIG. 4 sets forth a flow chart illustrating an exemplary method for concurrent maintenance of an I/O adapter backing a VNIC according to embodiments of the present invention that includes receiving (302), by a hardware management console (HMC) (126), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition; instructing (304), by the HMC (126) over a communications link, the virtual I/O server to deconfigure and remove the server VNIC driver, wherein the virtual I/O server, in response, gracefully shuts down the server VNIC driver, causing the server VNIC driver to deregister the CRQ with the hypervisor, and wherein in response to receiving a close message on the CRQ, the client VNIC driver enters a wait state; determining (306), by the HMC (126), that a replacement I/O adapter is installed on the computing system; and in response to determining that the replacement I/O adapter is installed on the computing system, instructing (308), by the HMC (126) over the communications link, the virtual I/O server to add and configure a replacement server VNIC driver, wherein the virtual I/O server, in response, instantiates the replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ.

The method of FIG. 4 differs from the method of FIG. 3, however, in that instructing (304), by the HMC (126) over a communications link, the virtual I/O server to deconfigure and remove the server VNIC driver, wherein the virtual I/O server, in response, gracefully shuts down the server VNIC driver, causing the server VNIC driver to deregister the CRQ with the hypervisor, and wherein in response to receiving a close message on the CRQ, the client VNIC driver enters a wait state includes instructing (402), by the HMC (126) over the communications link, the virtual I/O server to deconfigure and remove an I/O driver for the I/O adapter. Instructing (402), by the HMC (126) over the communications link, the virtual I/O server to deconfigure and remove an I/O driver for the I/O adapter may be carried out by first sending an instruction to deconfigure the I/O driver. Once the HMC (126) is notified that the virtual I/O server has successfully deconfigured the I/O driver, or after a period of time, the HMC (126) may send a separate instruction to remove the I/O adapter partitionable endpoint.

In response to receiving the instruction to deconfigure the I/O driver, the virtual I/O server may release resources assigned to the I/O driver. The virtual I/O server may also delete the I/O driver. In response to receiving the instruction to remove the I/O adapter partitionable endpoint, the virtual I/O server may relinquish control and ownership of the partitionable endpoint.

Instructing (402), by the HMC (126) over the communications link, the virtual I/O server to deconfigure and remove an I/O driver for the I/O adapter may also be carried out by instructing, by the HMC (126) over the communications link, the virtual I/O server to deconfigure and remove a virtual function for an SR-Mv adapter. In response to receiving the instruction to deconfigure the virtual function, the virtual I/O server may release resources assigned to the virtual function and/or any device driver associated with the virtual function. The virtual I/O server may also delete the device driver for the virtual function. In response to receiving the instruction to remove the virtual function, the virtual I/O server may delete the virtual function or release control and ownership of the virtual function partitionable endpoint.

The method of FIG. 4 also differs from the method of FIG. 3 in that instructing (308), by the HMC (126) over the communications link, the virtual I/O server to add and configure a replacement server VNIC driver, wherein the virtual I/O server, in response, instantiates the replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ includes instructing (404), by the HMC (126) over the communications link, the virtual I/O server to add and configure a replacement I/O driver for the I/O adapter. Instructing (404), by the HMC (126) over the communications link, the virtual I/O server to add and configure a replacement I/O driver for the I/O adapter may be carried out by first sending an instruction to add the I/O driver and/or an I/O adapter partitional endpoint. Once the HMC (126) is notified that the virtual I/O server has successfully added the replacement I/O driver and/or a I/O adapter partitionable endpoint, or after a period of time, the HMC (126) may send a separate instruction to configure the replacement I/O driver associated with the I/O adapter partitionable endpoint.

In response to receiving the instruction to add the replacement I/O driver and/or the I/O adapter partitional endpoint, the virtual I/O server may take ownership and control of the I/O adapter partitionable endpoint. In response to receiving the instruction to configure the I/O driver and/or the I/O adapter partitional endpoint, the virtual I/O server may instantiate the I/O driver and device drivers for I/O resources associated with the I/O adapter and assign resources to the I/O driver and other device drivers.

Instructing (404), by the HMC (126) over the communications link, the virtual I/O server to add and configure a replacement I/O driver for the I/O adapter may be carried out by instructing, by the HMC (126) over the communications link, the virtual I/O server to add and configure a replacement virtual function for the SR-IOV adapter. In response to receiving the instruction to add the replacement virtual function, the virtual I/O server may take ownership and control of the virtual function partitionable endpoint. In response to receiving the instruction to configure the virtual function, the virtual I/O server may instantiate device drivers for the I/O resources associated with the virtual function and assign resources to the virtual function and/or the device driver associated with the virtual function.

For further explanation, FIG. 5 sets forth a flow chart illustrating an exemplary method for concurrent maintenance of an I/O adapter backing a VNIC according to embodiments of the present invention that includes receiving (302), by a hardware management console (HMC) (126), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition; instructing (304), by the HMC (126) over a communications link, the virtual I/O server to deconfigure and remove the server VNIC driver, wherein the virtual I/O server, in response, gracefully shuts down the server VNIC driver, causing the server VNIC driver to deregister the CRQ with the hypervisor, and wherein in response to receiving a close message on the CRQ, the client VNIC driver enters a wait state; determining (306), by the HMC (126), that a replacement I/O adapter is installed on the computing system; and in response to determining that the replacement I/O adapter is installed on the computing system, instructing (308), by the HMC (126) over the communications link, the virtual I/O server to add and configure a replacement server VNIC driver, wherein the virtual I/O server, in response, instantiates the replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ.

The method of FIG. 5 differs from the method of FIG. 3, however, in that receiving (302), by a hardware management console (HMC) (126), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition includes determining (502), by the HMC using partition configuration data, that the virtual I/O server and the logical partition are affected by disconnecting the I/O adapter from the computing system. Determining (502), by the HMC using partition configuration data, that the virtual I/O server and the logical partition are affected by disconnecting the I/O adapter from the computing system may be carried out by using an identifier for the I/O adapter as a key into the partition configuration data to obtain information about the I/O adapter, including the virtual I/O server locations of the associated I/O resources. Using the virtual I/O server information, the HMC (126) may then determine the logical partitions and client VNIC drivers affected by disconnected the I/O adapter.

The method of FIG. 5 also differs from the method of FIG. 3, however, in that determining (306), by the HMC (126), that a replacement I/O adapter is installed on the computing system includes acquiring (504) a power domain service lock, powering off the power domain, posting instructions for parts replacement, powering on the power domain, and releasing the power domain service lock. Acquiring (504) a power domain service lock, powering off the power domain, posting instructions for parts replacement, powering on the power domain, and releasing the power domain service lock may be carried out by the HMC (126) sending a command to the hypervisor to obtain a power domain service lock for the physical I/O adapter. The hypervisor may then verify that each of the virtual adapters, virtual functions, and/or other partitionable endpoints associated with the physical I/O adapter have been relinquished. The hypervisor may then assume ownership of the virtual adapters, virtual functions, and/or other partitionable endpoints associated with the physical I/O adapter on behalf of the requesting HMC (126). The hypervisor may then update the service lock table in hypervisor memory to reflect that the requesting HMC (126) has the service lock for the physical I/O adapter. The HMC (126) may then send commands to the hypervisor to power off the physical I/O adapter. Once the hypervisor receives the instruction to power off the physical I/O adapter, the hypervisor may verify that the requesting HMC (126) has the service lock for the physical I/O adapter. The hypervisor may then power off the physical I/O adapter.

Once the physical I/O adapter is powered off, the HMC may provide instructions to the user for replacing the physical I/O adapter. Once the user replaces the physical I/O adapter, the HMC may send commands to the hypervisor to power on the physical I/O adapter. The hypervisor may then verify that the requesting HMC (126) has the service lock for the physical I/O adapter and power on the physical I/O adapter. The HMC may then send a command to the hypervisor to release the power domain service lock for the physical I/O adapter. The hypervisor may then release ownership of the virtual adapters, virtual functions, and/or other partitionable endpoints associated with the physical I/O adapter on behalf of the requesting HMC (126). The hypervisor may then update the service lock table in hypervisor memory to reflect that the service lock for the physical I/O adapter is no longer held.

In view of the explanations set forth above, readers will recognize that the benefits of concurrent maintenance of an I/O adapter backing a VNIC according to embodiments of the present invention include:

Improving the operation of a computing system by performing automatically, and without user intervention, necessary tasks in preparation of removing an I/O adapter from a computing system, increasing system efficiency.

Improving the operation of a computing system by performing remote tasks for removing an I/O adapter automatically, removing the necessity of a user to directly interact with virtual I/O servers and logical partitions for the removal operation, increasing system efficiency.

Exemplary embodiments of the present invention are described largely in the context of a fully functional computer system for concurrent maintenance of an I/O adapter backing a VNIC. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for concurrent maintenance of an input/output (I/O) adapter backing a virtual network interface connection (VNIC), the method comprising:
   receiving, by a hardware management console (HMC), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition;
   instructing, by the HMC over a communications link, the virtual I/O server to deconfigure and remove the server VNIC driver, wherein the virtual I/O server, in response, gracefully shuts down the server VNIC driver, causing the server VNIC driver to deregister the CRQ with the hypervisor, and wherein in response to receiving a close message on the CRQ, the client VNIC driver enters a wait state;
   determining, by the HMC, that a replacement I/O adapter is installed on the computing system; and
   in response to determining that the replacement I/O adapter is installed on the computing system, instructing, by the HMC over the communications link, the virtual I/O server to add and configure a replacement server VNIC driver, wherein the virtual I/O server, in response, instantiates the replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ.

2. The method of claim 1, wherein the HMC is executing on a HMC host system communicatively coupled to the computing system via the communications link.

3. The method of claim 1,
   wherein instructing, by the HMC over the communications link, the virtual I/O server to deconfigure and remove the server VNIC driver comprises instructing, by the HMC over the communications link, the virtual I/O server to deconfigure and remove an I/O driver for the I/O adapter, and
   wherein instructing, by the HMC over the communications link, the virtual I/O server to add and configure a replacement server VNIC driver comprises instructing, by the HMC over the communications link, the virtual I/O server to add and configure a replacement I/O driver for the I/O adapter.

4. The method of claim 3,
   wherein the I/O adapter is a single root I/O virtualization (SR-IOV) adapter,
   wherein instructing, by the HMC over the communications link, the virtual I/O server to deconfigure and remove the I/O driver for the I/O adapter comprises instructing, by the HMC over the communications link, the virtual I/O server to deconfigure and remove a virtual function for the SR-IOV adapter,
   wherein instructing, by the HMC over the communications link, the virtual I/O server to add and configure the replacement I/O driver for the I/O adapter comprises instructing, by the HMC over the communications link, the virtual I/O server to add and configure a replacement virtual function for the SR-IOV adapter.

5. The method of claim 1, wherein receiving, by the HMC, the request to disconnect the I/O adapter from the computing system comprises:
   determining, by the HMC using partition configuration data, that the virtual I/O server and the logical partition are affected by disconnecting the I/O adapter from the computing system.

6. The method of claim 1, wherein determining, by the HMC, that the replacement I/O adapter is installed on the computing system comprises acquiring a power domain service lock, powering off the power domain, posting instructions for parts replacement, powering on the power domain, and releasing the power domain service lock.

7. The method of claim 1, wherein instructing, by the HMC over the communications link, the virtual I/O server to add and configure the replacement server VNIC driver comprises sending, to the virtual I/O server, an identifier of the client VNIC driver.

8. An apparatus for concurrent maintenance of an input/output (I/O) adapter backing a virtual network interface connection (VNIC), the apparatus comprising a circuit configured to carry out the steps of:
   receiving, by a hardware management console (HMC), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition;
   instructing, by the HMC over a communications link, the virtual I/O server to deconfigure and remove the server VNIC driver, wherein the virtual I/O server, in response, gracefully shuts down the server VNIC driver, causing the server VNIC driver to deregister the CRQ with the hypervisor, and wherein in response to receiving a close message on the CRQ, the client VNIC driver enters a wait state;
   determining, by the HMC, that a replacement I/O adapter is installed on the computing system; and
   in response to determining that the replacement I/O adapter is installed on the computing system, instructing, by the HMC over the communications link, the virtual I/O server to add and configure a replacement server VNIC driver, wherein the virtual I/O server, in response, instantiates the replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ.

9. The apparatus of claim 8, wherein the HMC is executing on a HMC host system communicatively coupled to the computing system via the communications link.

10. The apparatus of claim 8,
   wherein instructing, by the HMC over the communications link, the virtual I/O server to deconfigure and remove the server VNIC driver comprises instructing, by the HMC over the communications link, the virtual I/O server to deconfigure and remove an I/O driver for the I/O adapter, and
   wherein instructing, by the HMC over the communications link, the virtual I/O server to add and configure a replacement server VNIC driver comprises instructing, by the HMC over the communications link, the virtual I/O server to add and configure a replacement I/O driver for the I/O adapter.

11. The apparatus of claim 10,
   wherein the I/O adapter is a single root I/O virtualization (SR-IOV) adapter,
   wherein instructing, by the HMC over the communications link, the virtual I/O server to deconfigure and remove the I/O driver for the I/O adapter comprises instructing, by the HMC over the communications link, the virtual I/O server to deconfigure and remove a virtual function for the SR-IOV adapter
   wherein instructing, by the HMC over the communications link, the virtual I/O server to add and configure the replacement I/O driver for the I/O adapter comprises instructing, by the HMC over the communications link, the virtual I/O server to add and configure a replacement virtual function for the SR-IOV adapter.

12. The apparatus of claim 8, wherein receiving, by the HMC, the request to disconnect the I/O adapter from the computing system comprises:
   determining, by the HMC using partition configuration data, that the virtual I/O server and the logical partition are affected by disconnecting the I/O adapter from the computing system.

13. The apparatus of claim 8, wherein determining, by the HMC, that the replacement I/O adapter is installed on the computing system comprises acquiring a power domain service lock, powering off the power domain, posting instructions for parts replacement, powering on the power domain, and releasing the power domain service lock.

14. The apparatus of claim 8, wherein instructing, by the HMC over the communications link, the virtual I/O server to add and configure the replacement server VNIC driver comprises sending, to the virtual I/O server, an identifier of the client VNIC driver.

15. A computer program product for concurrent maintenance of an input/output (I/O) adapter backing a virtual network interface connection (VNIC), the computer program product comprising a computer readable storage medium having, program instructions embodied therewith, the program instructions executable by a computer to cause the computer to carry out the steps of:
   receiving, by a hardware management console (HMC), a request to disconnect the I/O adapter from a computing system, wherein the computing system comprises a logical partition and virtual I/O server, wherein the virtual I/O server provides, to the logical partition, access to the I/O adapter via a server VNIC driver within the virtual I/O server and a client VNIC driver within the logical partition, and wherein the server VNIC driver is communicatively coupled to the client VNIC driver via a command response queue (CRQ) within a hypervisor hosting the virtual I/O server and the logical partition;
   instructing, by the HMC over a communications link, the virtual I/O server to deconfigure and remove the server VNIC driver, wherein the virtual I/O server, in response, gracefully shuts down the server VNIC driver, causing the server VNIC driver to deregister the CRQ with the hypervisor, and wherein in response to receiving a close message on the CRQ, the client VNIC driver enters a wait state;
   determining, by the HMC, that a replacement I/O adapter is installed on the computing system; and
   in response to determining that the replacement I/O adapter is installed on the computing system, instructing, by the HMC over the communications link, the virtual I/O server to add and configure a replacement server VNIC driver, wherein the virtual I/O server, in response, instantiates the replacement server VNIC driver, causing the replacement server VNIC driver to register the CRQ with the hypervisor and send an initialization message to the client VNIC driver via the CRQ, and wherein in response to receiving the initialization message on the CRQ, the client VNIC driver exits the wait state and resumes communication on the CRQ.

16. The computer program product of claim 15, wherein the HMC is executing on a HMC host system communicatively coupled to the computing system via the communications link.

17. The computer program product of claim 15,
wherein instructing, by the HMC over the communications link, the virtual I/O server to deconfigure and remove the server VNIC driver comprises instructing, by the HMC over the communications link, the virtual I/O server to deconfigure and remove an I/O driver for the I/O adapter, and
wherein instructing, by the HMC over the communications link, the virtual I/O server to add and configure a replacement server VNIC driver comprises instructing, by the HMC over the communications link, the virtual I/O server to add and configure a replacement I/O driver for the I/O adapter.

18. The computer program product of claim 17,
wherein the I/O adapter is a single root I/O virtualization (SR-IOV) adapter,
wherein instructing, by the HMC over the communications link, the virtual I/O server to deconfigure and remove the I/O driver for the I/O adapter comprises instructing, by the HMC over the communications link, the virtual I/O server to deconfigure and remove a virtual function for the SR-IOV adapter
wherein instructing, by the HMC over the communications link, the virtual I/O server to add and configure the replacement I/O driver for the I/O adapter comprises instructing, by the HMC over the communications link, the virtual I/O server to add and configure a replacement virtual function for the SR-IOV adapter.

19. The computer program product of claim 15, wherein receiving, by the HMC, the request to disconnect the I/O adapter from the computing system comprises:
determining, by the HMC using partition configuration data, that the virtual I/O server and the logical partition are affected by disconnecting the I/O adapter from the computing system.

20. The computer program product of claim 15, wherein determining, by the HMC, that the replacement I/O adapter is installed on the computing system comprises acquiring a power domain service lock, powering off the power domain, posting instructions for parts replacement, powering on the power domain, and releasing the power domain service lock.

* * * * *